United States Patent Office 2,842,511
Patented July 8, 1958

2,842,511

PROCESS FOR OBTAINING GRAIN-FREE POLYSTYRENE LATICES

Ernest Alexander Sutton, Springfield, and Costas H. Basdekis, Longmeadow, Mass., assignors to Monsanto Chemical Company, St. Louis, Mo., a corporation of Delaware No Drawing. Application May 13, 1954
Serial No. 429,703

5 Claims. (Cl. 260—29.6)

This invention relates to grain-free high solids polystyrene latices. More particularly, this invention relates to a process for obtaining grain-free high solids polystyrene latices.

Aqueous emulsions of polystyrene grains within the 0.1–0.3 micron range are commonly referred to as polystyrene latices. High solids polystyrene latices of this nature (i. e., latices containing about 45–60% solids) are of utility in the preparation of surface coatings. However, such high-solids latices, as initially prepared, almost invariably contain a small percentage of oversize grains ranging in size from those which are about 0.5 micron in diameter to those which are visible to the naked eye. Such over-size grains must be removed if satisfactory surface coatings are to be obtained from the polystyrene latices.

Accordingly, an object of the present invention is the provision of a process for removing over-size grains from polystyrene latices.

Another object is the provision of a process for cheaply and efficiently removing over-size grains from high solids polystyrene latices at a reasonable production rate.

These and other objects are attained by filtering a 45–60% solids polystyrene latex in the presence of about 0.1–2% by weight of a diatomaceous earth, preferably a diatomaceous earth about 70% of the particles of which are larger than 10 microns in diameter.

The following example is given in illustration and is not intended as limitations on the scope of this invention. Where parts are mentioned, they are parts by weight.

*Example I*

Add about 0.5 part of a diatomaceous earth to 100 parts of a 50% solids polystyrene latex containing about 1% by weight of over-size grains, about 50% of the diatomaceous earth particles being larger than about 30 microns in diameter and about 45% of the particles being intermediate 10 and 30 microns in diameter. Pass the resultant mixture through filter paper under about 10 inches of vacuum in a suitable filtration apparatus. It is found that all of the over-size grains are trapped on the filter paper and that the remainder of the latex passes through the filter paper without alteration of physical properties. Filtration is obtained at the rate of about 100 gallons of latex per hour per square foot of filter area.

If 1.0 part of the above diatomaceous earth is used for each 100 parts of polystyrene latex, it is found that the over-size grains are effectively removed but that the filtration rate is reduced by about 50%. If 3.0 parts of the diatomaceous earth is used, the over-size grains are removed but the filtration rate is reduced by about 90%. From this it is seen that rapid filtration is obtained only when less than about 1 part of the diatomaceous earth is used for each 100 parts of latex and that the filtration rate is unsatisfactroy if more than about 2 parts of the diatomaceous earth are used.

The over-size grains are removed when the diatomaceous earth of Example I is replaced with a diatomaceous earth containing only about 55% of particles larger than about 10 microns in diameter. In this instance, however, it is found that the filtration rate is only about 40 gallons of latex per hour per square foot of filter area when about 0.5 part of diatomaceous earth per 100 parts of latex is used. The filtration rate is further reduced to about 20 gallons per hour per square foot of filter area when about 1.0 part of the diatomaceous earth per 100 parts of latex is used.

The filter will completely plug on attempting to filter the polystyrene latex of Example I in the absence of an appropriate amount of diatomaceous earth. Complete plugging of the filter is also encountered when other additives such as fuller's earth, calcium sulfate, powdered polystyrene, powdered silica, acid bentonite, etc. are substituted for the diatomaceous earth.

Although filtration of over-size grains can be obtained with most diatomaceous earths, the foregoing results show that a reasonable filtration rate is obtainable only with diatomaceous earths which contain more than about 70% of particles larger than 10 microns in diameter. A preferred diatomaceous earth which gives the best results is the diatomaceous earth of Example I which contained about 50% particles larger than about 30 microns and about 45% particles intermediate 10 and 30 microns in size.

The amount of the diatomaceous earth to be used is critical if a satisfactory filtration rate is to be obtained. Generally speaking, the over-size grains will not be effectively removed if less than about 0.1 part of diatomaceous earth per 100 parts of latex is used while the filtration rate will be inordinately slow if more than about 2 parts of diatomaceous earth per 100 parts of latex is used. It is preferable to use less than about 1 part and, for best results, about 0.5 part of diatomaceous earth for each 100 parts of latex.

Filtration of the over-size grain-containing high-solids polystyrene latices may be accomplished in accordance with the present invention by any suitable conventional method such as filtration under atmospheric pressure, vacuum filtration, pressure filtration through a suitable cloth and backing, etc.

What is claimed is:

1. A process which comprises mixing about 0.1–2.0 parts by weight of a diatomaceous earth, at least 70% by weight of the particles of which are larger than about 10 microns in diameter, with 100 parts by weight of a 45–60% solids aqueous polystyrene latex containing over-size grains having a particle size of at least about 0.5 micron and then filtering the resultant mixture to obtain a latex free of said over-size grains.

2. A process as in claim 1 wherein less than about 1% of diatomaceous earth is used.

3. A process as in claim 1 wherein about 0.5% of a diatomaceous earth is used.

4. A process as in claim 1 wherein the diatomaceous earth contains about 50% particles larger than about 30 microns and about 45% intermediate 10 microns and 30 microns in diameter.

5. A process as in claim 4 wherein about 0.5% of diatomaceous earth is used.

References Cited in the file of this patent

UNITED STATES PATENTS

| | | |
|---|---|---|
| 2,486,756 | Murphy et al. | Nov. 1, 1949 |
| 2,565,960 | Garber et al. | Aug. 28, 1951 |

OTHER REFERENCES

Industrial & Engineering Chemistry, August 1949, pages 1589–1590.

Chemical Engineers Handbook, 3rd edition (1950), pages 968–970.